(12) United States Patent
Georgy et al.

(10) Patent No.: US 10,054,442 B2
(45) Date of Patent: Aug. 21, 2018

(54) METHOD AND APPARATUS FOR HANDLING VERTICAL ORIENTATIONS OF DEVICES FOR CONSTRAINT FREE PORTABLE NAVIGATION

(71) Applicant: Trusted Positioning, Inc., Calgary (CA)

(72) Inventors: Jacques Georgy, Calgary (CA); Zainab Syed, Calgary (CA)

(73) Assignee: InvenSense, Inc., San Jose, CA (US)

( * ) Notice: Subject to any disclaimer, the term of this patent is extended or adjusted under 35 U.S.C. 154(b) by 363 days.

(21) Appl. No.: 14/760,973

(22) PCT Filed: Jan. 17, 2014

(86) PCT No.: PCT/CA2014/000039
§ 371 (c)(1),
(2) Date: Jul. 14, 2015

(87) PCT Pub. No.: WO2014/110671
PCT Pub. Date: Jul. 24, 2014

(65) Prior Publication Data
US 2015/0354962 A1 Dec. 10, 2015

Related U.S. Application Data

(60) Provisional application No. 61/753,650, filed on Jan. 17, 2013.

(51) Int. Cl.
*G01C 9/00* (2006.01)
*G01C 21/00* (2006.01)
(Continued)

(52) U.S. Cl.
CPC ............. *G01C 21/00* (2013.01); *G01B 21/22* (2013.01); *G01C 21/20* (2013.01)

(58) Field of Classification Search
CPC ......... G01C 21/00; G01C 21/20; G01B 21/22
(Continued)

(56) References Cited

U.S. PATENT DOCUMENTS 6,975,959 B2 12/2005 Dietrich et al.
8,351,773 B2 1/2013 Nasiri et al.
(Continued)

FOREIGN PATENT DOCUMENTS

EP 1315945 B2 6/2003

OTHER PUBLICATIONS

International Search Report and Written Opinion—PCT/CA2014/000039—ISA/US—dated Jan. 5, 2014.

*Primary Examiner* — Tha-O H Bui
(74) *Attorney, Agent, or Firm* — Bay Area Technology Law Group PC

(57) ABSTRACT

The present disclosure relates to a method and apparatus for enhancing a navigation solution of a device within a platform (such as for example person, vehicle or vessel), wherein the mobility of the device may be constrained or unconstrained within the platform, and wherein the device can be tilted to any orientation including vertical or near vertical orientations, while still providing a seamless navigation solution. This method can enhance navigation solutions utilizing measurements from sensors (such as, for example, accelerometers, gyroscopes, magnetometers, etc.), whether in the presence or in the absence of absolute navigational information (such as, for example, GNSS or WiFi positioning).

11 Claims, 8 Drawing Sheets

(51) Int. Cl.
*G01B 21/22* (2006.01)
*G01C 21/20* (2006.01)

(58) Field of Classification Search
USPC .......................................................... 702/151
See application file for complete search history.

(56) References Cited

U.S. PATENT DOCUMENTS

| 2007/0260398 | A1  | 11/2007 | Stelpstra |           |
|--------------|-----|---------|-----------|-----------|
| 2009/0254279 | A1  | 10/2009 | Han et al. |          |
| 2010/0192662 | A1* | 8/2010  | Yanni ..................... | G01P 21/00 |
|              |     |         |           | 73/1.38   |
| 2013/0138390 | A1* | 5/2013  | Shikatani ............... | G01C 21/10 |
|              |     |         |           | 702/141   |

* cited by examiner

METHOD AND APPARATUS FOR HANDLING VERTICAL ORIENTATIONS OF DEVICES FOR CONSTRAINT FREE PORTABLE NAVIGATION

TECHNICAL FIELD

The present disclosure relates to a method and apparatus for enhancing a navigation solution of a device within a platform (such as for example person, vehicle, or vessel), wherein mobility of the device may be constrained or unconstrained within the platform, and wherein the device can be tilted to any orientation including vertical or near vertical orientations and still provide seamless navigation.

BACKGROUND

Inertial navigation of a platform is based upon the integration of specific forces and angular rates as measured by inertial sensors (e.g. accelerometer, gyroscopes) of a device containing the sensors and positioned within a motion-capable platform. In traditional systems, the device is tethered to the platform. Measurements from the device may be used to determine the position, velocity and attitude of the device and/or the platform.

Alignment of the inertial sensors within the platform (i.e. alignment of the device containing the sensors with the platform's forward, transversal and vertical axis) is typically required for traditional inertial navigation systems. Where the inertial sensors are not properly aligned, the positions and attitude calculated using measurements from the inertial sensors will not be representative of the state of the platform. As such, in order to achieve high accuracy navigation solutions, inertial sensors must be tethered within the platform and careful manual mounting of the device within the platform is needed.

Portable navigation devices (or navigation-capable devices), however, are able to move, whether constrained or unconstrained within the platform (such as for example a person, vehicle, or vessel of any type), and careful mounting or tethering of the device to the platform is not an option.

As navigation-capable devices (e.g. mobile/smart phones) become increasingly popular, they can come equipped with Assisted Global Positioning System (AGPS) chipsets having high sensitivity capabilities capable of providing absolute positioning of the platform (e.g. user) even in environments without a clear line of sight to satellite signals. In environments where AGPS information alone is not enough, such as deep indoors or in challenging downtown navigation or localization, one possible solution is to incorporate cell tower identification or, if possible, trilateration of cell towers for a position fix (where AGPS solution is unavailable). Despite these two known positioning methods available in many mobile devices, accurate indoor localization still presents a challenge and fails to satisfy the accuracy demands of current location based services (LBS). Additionally, these methods may only provide the absolute heading of the platform, without any information on the device's heading.

Mobile navigation-capable devices (e.g. mobile/smart phones) can come equipped with Micro Electro Mechanical System (MEMS) sensors that are used predominantly for screen control and entertainment applications. These sensors have not been broadly used to date for navigation purposes due to very high noise, large random drift rates, and frequently changing orientations of the device with respect to the platform.

Mobile devices can also come equipped with magnetometers, and in some cases, it has been shown that a navigation solution using accelerometers and magnetometers may be possible if the user is careful enough to keep the device in a specific orientation with respect to their body, such as when held carefully in front of the user after calibrating the magnetometer.

There is a need, however, for a method of providing a navigation solution that is capable of accurately utilizing measurements from a navigation-capable device within a platform, and thereby determining the navigation state of the device/platform without any constraints on the platform (i.e. in indoor or outdoor environments) or the mobility of the device within the platform. The estimation of the position and attitude of the platform should be independent of the usage of the device (e.g. the way the user is holding or moving the device during navigation).

There is also a need for such a method to allow for the device to be tilted in any orientation, including vertical or near vertical orientations, while still providing seamless navigation information without degradation in performance. Difficulties arise when a mobile navigation-capable device becomes vertical or near vertical because azimuth (also called heading) and roll of the device can have large variations, which can also cause a large variation in the azimuth estimation of the platform. It is understood that the large variations in the azimuth and roll of the device result because of the definition of pitch, roll, and azimuth. Pitch angle is from −90 degrees to 90 degrees, while azimuth and roll are each from −180 degrees to 180 degrees.

The azimuth angle is the heading clockwise from North direction in the East-North plane, the pitch angle of the device is the angle between the forward axis of the sensor frame of the device and the East-North plane, the roll angle is the angle around the forward axis of the device. When the pitch angle goes towards 90 degrees or −90 degrees and because of the definition especially the discontinuity in the pitch angle as defined, both the roll and azimuth tend to represent angles in the East-North plane as the forward axis of the device becomes vertical. Furthermore, if the pitch angle changes from 80 degrees towards 90 degrees, the angle will go back towards 80 degrees at the point where it wanted to cross the 90 degrees. The same happens if the pitch angle changes from −80 degrees towards −90 degrees, that is—the angle will go back towards −80 degrees at the point where it wanted to cross the −90 degrees. As a result, the azimuth and roll tend to flip by 180 degrees, which causes problems to navigation solutions using the sensors in the device.

Thus, a method for mitigating the above described problem when the pitch angle of the device approaches near 90 or −90 degrees is required.

SUMMARY

A method and apparatus capable of detecting a transition in the forward axis of a device, wherein the mobility of the device may be constrained or unconstrained within a platform, wherein the device can be tilted to any orientation including vertical or near vertical orientations, wherein the device has sensors capable of providing sensor readings, said sensor readings having error parameters, wherein the transition involves a vertical or near vertical orientation, and, where the transition is detected, updating the axes frame, changing the sensor readings and error parameters according to the updated axes frame, and adjusting the estimated orientation of the device according to the updated axes frame.

The transition detected in the forward axis of the device may be one of the following:
from horizontal or near horizontal to vertical or near vertical,
from vertical or near vertical to horizontal or near horizontal,
from vertical up or near vertical up to vertical down or near vertical down, or
from vertical down or near vertical down to vertical up or near vertical up.

The present method and apparatus may be used for enhancing a navigation solution of a device within a platform, wherein the mobility of the device may be constrained or unconstrained within the platform, and wherein the device can be tilted to any orientation, including vertical or near vertical orientations, while still providing a seamless navigation solution and without degrading the performance of said navigation solution.

The present method may be used for a navigation solution utilizing measurements (readings) from sensors (such as for example, accelerometers, gyroscopes, magnetometers etc.) within the device, whether in the presence or in the absence of navigational information updates (such as, for example, Global Navigation Satellite System (GNSS) or WiFi positioning).

The present device may comprise an assembly of sensors capable of providing sensor readings, said sensors having a corresponding frame for the sensors' axes, and said sensor readings have corresponding sensors' error parameters.

The present method may be used whether in the presence or in the absence of absolute navigational information.

In one embodiment, the present method may further comprise a routine capable of avoiding the use of continuous unneeded transitions between axes frames. For example, where the transition is detected because of the device with a pedestrian in hand dangling scenario (also called hand swinging) that is continuously moving between horizontal or near horizontal and vertical or near vertical and vice versa.

In another embodiment, the present method may further comprise a routine capable of detecting whether a transition is legitimate, not a noise or an instantaneous unneeded transition.

In yet another embodiment, the present method may further comprise a re-alignment routine after a transition is detected, for fully or partially re-initializing the navigation solution according to the updated axes frame definition.

In yet another embodiment, the present method may adjust the output pitch and roll of the navigation solution from the internal pitch and roll values based on the current axes frame definition, for these adjusted pitch and roll to be defined in a default axes frame definition.

It is understood that any one of the foregoing embodiments may be used optionally, either alone or in combination.

Broadly stated, in some embodiments, a method and apparatus for enhancing a navigation solution of a device, said device having sensors capable of providing sensor readings, wherein said sensors have a corresponding axes frame and said readings have corresponding error parameters, wherein the mobility of the device may be constrained or unconstrained within a platform, and wherein the device can be tilted to any orientation including vertical or near vertical orientations, the method comprising detecting a transition in the forward axis of the device in any one of the following manners: (i) from horizontal or near horizontal to vertical or near vertical, (ii) from vertical or near vertical to horizontal or near horizontal, (iii) from vertical up or near vertical up to vertical down or near vertical down, or (iv) from vertical down or near vertical down to vertical up or near vertical up; and where a transition is detected, updating the axes frame, and changing the sensor readings and error parameters according to the updated axes frame, and adjusting the orientation of the device according to the updated axes frame, the method as defined herein.

DESCRIPTION OF EMBODIMENTS

Generally, a method and apparatus capable of detecting a transition in the forward axis of a device within a platform, and, where a transition is detected, updating the axes frame and adjusting the estimated orientation of the device according to the updated axes frame is provided.

In one embodiment, the present method and apparatus may be used for enhancing a navigation solution of a device within a platform is provided, the device having sensors capable of providing sensor readings about the device, wherein the sensors have a corresponding axes frame and the sensor readings have corresponding sensor parameters. More specifically, the present method is capable of providing a seamless navigation solution of the device, wherein the mobility of the device may be constrained or unconstrained within the platform, and wherein the device can be tilted to any orientation including vertical or near vertical orientations.

The present method may utilize measurements from the sensors on the device (such as for example, accelerometers, gyroscopes, magnetometers, barometer etc.), whether in presence or in the absence of navigational information updates (such as, for example, GPS or WiFi positioning).

The platform may be a motion-capable platform that may be temporarily stationary. Some example platforms may be a person, a vehicle or a vessel of any type. The vessel may be land-based, marine or airborne.

The present method may be used in a variety of applications including those that comprise navigation solutions about a device and/or platform including:
position, velocity and attitude or
only position and attitude,
or partial navigation solution including:
only attitude and velocity or
only attitude.

It is known that, during normal use, the attitude of a device (e.g. portable phone) changes freely. Indeed, mobile devices often undergo rotational movements along any of their major axes, which constitutes its axes frame 10 (e.g. the x-axis, y-axis and z-axis) when positioned, for example, for texting in either landscape or portrait view, when positioned on a belt, in a pocket, or near a user's ear during phone use (where the device is a phone). Such axes and their frame 10 are defined in FIGS. 1(a), (b) and (c). Having regard for FIG. 1(a) the forward axis of the device is defined as x-axis, the vertical or z-axis is pointing downward and the transversal axis or y-axis is defined in a way to complete the right handed coordinate system.

Figure 1:
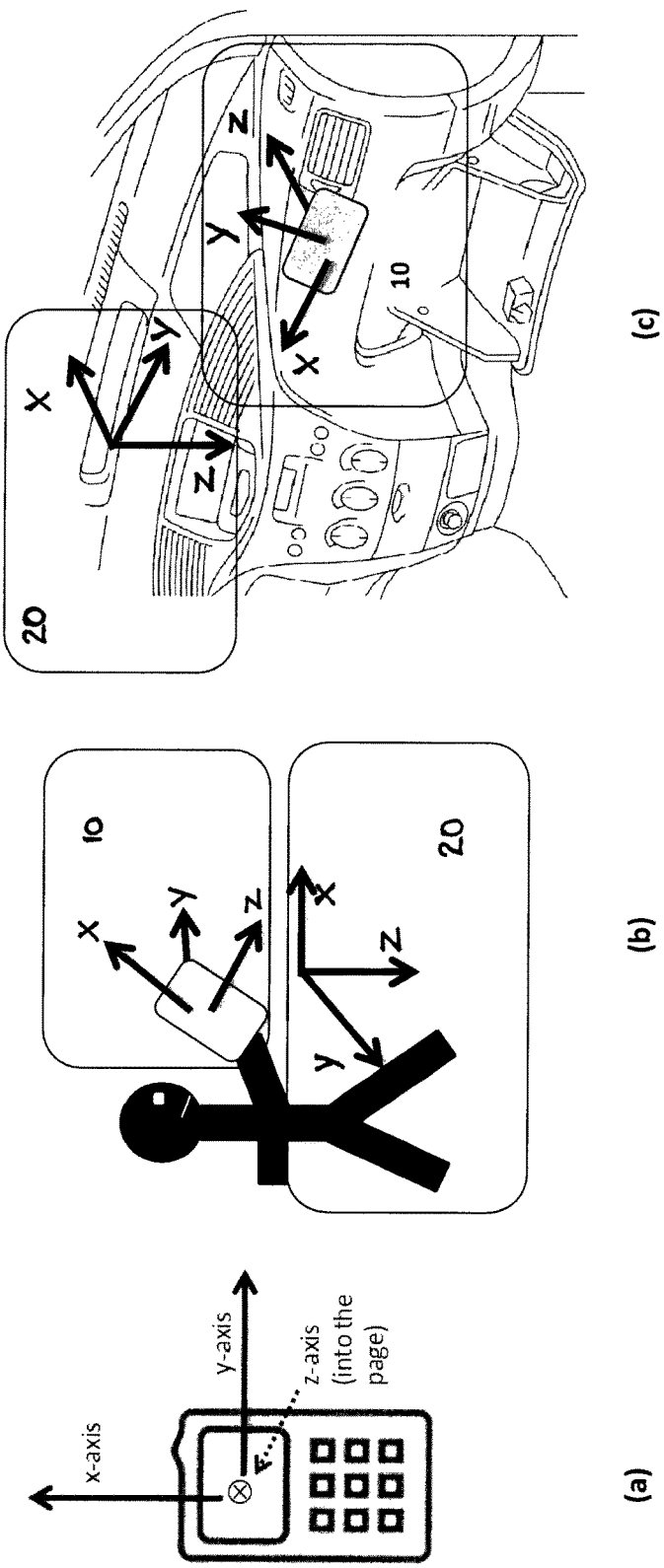
FIG. 1 shows the sensitive axes of the device (a), a depiction one embodiment of misalignment between the device and the platform, where the platform is a person (b) or a vehicle (c)

It is also known that the orientation of a device within a platform is not representative of the orientation of the platform. Having regard to FIGS. 1(b) and (c), the device may undergo any number of rotational movements along any of its major axes, with respect to the platform 20. Rotational movements of the device do not indicate that the platform is going through the same changes in orientation. For example, the user or platform may be moving on a leveled 2D plane while the device may be undergoing any number of possible roll and pitch angles. FIGS. 1(b) and (c) show several possible relationships between an unconstrained device 10 and different platforms 20.

Typical portable devices comprise accelerometers for measuring accelerations or specific forces, along each of the sensitive axis, i.e., the x-axis, y-axis and the z-axis. It is known that "roll" is defined as the rotation of the device along the forward x-axis, while "pitch" is the rotation along the lateral y-axis. Because the device user is free to rotate the device as desired, the device can have several changes in roll, pitch and heading with respect to the platform.

The device can be tilted to any orientation including vertical or near vertical orientations. For portable device navigation a seamless navigation solution is required in all scenarios, including these vertical scenarios. One problem occurring when the device becomes vertical or near vertical is that azimuth and roll of the device can have large variations, which will also cause a large variation in the azimuth estimation of the platform. The large variations in the azimuth and roll of the device result from the definition of pitch, roll, and azimuth. Pitch angle is from −90 degrees to 90 degrees, while azimuth and roll are each from −180 degrees to 180 degrees. For the original axes frame of the device, being vertical or near vertical means that the pitch angle is at or near either 90 degrees or −90 degrees, and being horizontal or near horizontal means not being vertical or near vertical.

The azimuth angle is the heading clockwise from North direction in the East-North plane, the pitch angle of the device is the angle between the forward axis of the sensor frame of the device and the East-North plane, the roll angle is the angle around the forward axis of the device. When the pitch angle approaches 90 degrees or −90 degrees, and because of the way the pitch, roll, and azimuth are defined especially because of the discontinuity in the pitch angle in this definition, both the roll and azimuth can represent angles in the East-North plane as the forward axis of the device becomes vertical. Furthermore, if the pitch angle changes from 80 degrees towards 90 degrees, the angle will revert back towards 80 degrees at the point where said angle wanted to cross the 90 degrees. This also occurs if the pitch angle changes from −80 degrees towards −90 degrees—that is, the angle will go back towards −80 degrees at the point where the angle wanted to cross the −90 degrees. In either case, the azimuth and roll tend to flip by 180 degrees, and results in difficulties in obtaining a navigation solution using the sensors in the device.

In order to address these difficulties, the present method can automatically detect when the forward axis of the device (forward axis of the accelerometer in the device) is vertical or near vertical or when this forward axis reverts back near horizontal again, and can trigger a routine for changing the axes definition and changing (swapping) the corresponding variables in the navigation system (such as, for example, the biases related to each axis). There are three axes definitions used, the main definition is the original one from the device (for example the original axes definition from the phone when the device is a phone), the second definition is when the forward axis of the device is vertical upward or near vertical upward, the third definition is when the forward axis of the device is vertical downward or near vertical downward. Such definitions can avoid difficulties that arise when the pitch angle becomes near 90 degrees or −90 degrees. It should be noted that sensors that have different axes following these definitions (such as, for example, accelerometers, gyroscopes, magnetometer) each undergo changes between the different definitions when the corresponding transition are detected, as well as all the parameters related to these sensors (such as for example biases and scale factors for the accelerometers and gyroscopes, as well as biases and scale factors for magnetometers).

The first step in the present method consists of detecting a transition of the forward axis of the device in any one of the following manners: (i) from horizontal or near horizontal to vertical or near vertical, (ii) from vertical or near vertical to horizontal or near horizontal, (iii) from vertical up or near vertical up to vertical down or near vertical down, (iv) from vertical down or near vertical down to vertical up or near vertical up.

In some embodiments, the detection of a transition in the forward axis of the device depends upon the pitch and roll angles, or on averaged values of the pitch and roll angles. The pitch and roll values may be calculated from any one of at least the following: (i) gyroscopes through known methods such as for example quaternions, (ii) accelerometers readings or averaged accelerometer readings (whether fixed-time average or moving average), or (iii) integrated navigation solution using known integration techniques, and integrating different sensors and/or systems such as for example some or all of the following: accelerometers, gyroscopes, magnetometers, barometer, odometer, or any navigational information updates (such as, for example, GNSS, WiFi, or any other wireless technique). The decision whether to use the pitch value, the roll value, or both to detect a transition can depend upon the current axes frame definition before the transition. In one such embodiment, the transition from horizontal or near horizontal to vertical or near vertical (whether upward or downward) is detected based on the pitch angle, while the transition from vertical or near vertical (whether upward or downward) to horizontal or near horizontal is detected either based on the pitch angle or the roll angle (this is due to the new definition of axes and thus new definitions of pitch and roll in the vertical or near vertical cases).

In some other embodiments, the detection of a transition in the forward axis of the device depends upon the accelerometers readings or an averaged version of the accelerometer readings. The accelerometer readings or an averaged version of the accelerometer readings (whether fixed-time average or moving average) may be used in any one or more of the following manners: (i) to detect the nearest axes to measure the accelerations of the gravity, (ii) to detect the different gravity components, or (iii) to calculate pitch and roll of the device.

In yet some other embodiments, the detection of a transition in the forward axis of the device depends upon both: (i) the pitch and roll angles or on averaged values of the pitch and roll angles, and (ii) the accelerometers readings or an averaged version of the accelerometer readings. In these embodiments, the different options in the first embodiments above (i.e. pitch and roll) and the different options in the second embodiments above (i.e. accelerometer readings) may also be used in this case in a similar manner.

In some embodiments, the detection of a transition in the forward axis of the device depends upon a single threshold value (whether a single threshold value for pitch and/or a single threshold value roll and/or a single threshold value for the accelerometer readings). In yet some other embodiments, the detection of a transition in the forward axis of the device depends upon multiple threshold values (whether for pitch and/or roll and/or the accelerometer readings). The multiple threshold values may be dependent upon the time-average of pitch and/or roll and/or the accelerometer readings over the latest predetermined duration.

When a transition is detected, the axes definitions are changed from the existing definition to a new updated definition based on the type of transition detected. The sensors having different axes following these definitions (such as, for example, accelerometers, gyroscopes, magnetometer) all undergo the changes between the different definitions when corresponding transition are detected, including their readings and all of the parameters related to these sensors (such as for example biases and scale factors for the accelerometers and gyroscopes, as well as biases and scale factors for magnetometers).

When a transition is detected and axes are changed from one definition to another, the attitude angles of the device are adjusted accordingly, including the azimuth (heading) of the device that is adjusted accordingly based on the previous azimuth, the nature of the transition (i.e. from which axes definition to which axes definition), and the triggering causes and factors of the transition (such as pitch value or history and/or roll value or history and/or azimuth history).

In some embodiments, the present method may be used whether in the presence or in the absence of absolute navigational information.

The present method may further comprise a routine capable of avoiding the use of continuous unneeded transitions between axes frames. An example for this is the case the transition happens because of having the device with a pedestrian in hand dangling scenario (also called hand swinging) that is continuously moving between horizontal or near horizontal and vertical or near vertical and vice versa. The device being with a pedestrian in hand-dangling mode can be detected based on the history of pitch and roll values or by the history of the accelerometer or gyroscope data. The benefit of this routine is to avoid having continuous unneeded transitions between different axes definitions.

The present method may further comprise a routine capable of detecting whether a transition is legitimate, and thus not a noise or an instantaneous unneeded transition. Such a routine may be based on a timeout. An instantaneous unneeded transition is, for example, when the device goes from a horizontal or near horizontal to horizontal or near horizontal, but instantaneously passes through vertical or near vertical. Another example may be when the device goes from a vertical up or near vertical up to vertical up or near vertical up, but instantaneously passes through horizontal or near horizontal. Another example may be when the device goes from a vertical down or near vertical down to vertical down or near vertical down, but instantaneously passes through horizontal or near horizontal. If a timeout is used, this routine may either:

1) trigger a true change of axes definition as soon as the timeout is done and the transition proves to be a legitimate transition; or
2) keep two solutions during the timeout period, one of them being the main solution and one being a temporary solution triggered when the timeout began. The former assumes that the transition is not legitimate, while the latter assumes that the transition is legitimate. As such, the present routine can trigger a second solution (other than the main solution) as soon as a transition is perceived, but not yet confirmed to be true (i.e. when the timeout starts), this solution assumes that the transition is legitimate. Moreover, the present routine can keep the main solution while assuming a transition did not happen (not true) until the timeout ends. When the timeout ends, the routine can elect to either: (i) keep the main solution where the transition is not proven (i.e. wrong or unneeded), thereby dismissing the second solution, or (ii) keep the second solution where the transition is proven to be legitimate and use same to override the main solution.

The present method may further comprise a re-alignment routine that may be run after a transition is detected and the axes definitions are changed in order to re-initialize the present navigation solution with all (i.e. fully) or some (i.e. partially) of its variables and quantities according to the new updated axes frame definition. Such a re-alignment routine may be achieved in one iteration (i.e. in one epoch of inertial sensors readings), or may have a pre-determined time duration.

The present method may further comprise a routine capable of adjusting the output pitch and/or roll of the present navigation solution from the internal pitch and/or roll values, based on the current axes definition for these adjusted pitch and roll to be defined in a default axes definition. Such an adjustment may be beneficial because the definition of the output pitch and/or roll will follow one axes definition and will not change when a transition occurs. In one embodiment, the default axes definition is the one when the device is horizontal or near horizontal (the i.e. the original axes definition of the device).

It is understood that any one of the foregoing embodiments may be used optionally, and either alone or in combination.

Figure 2:
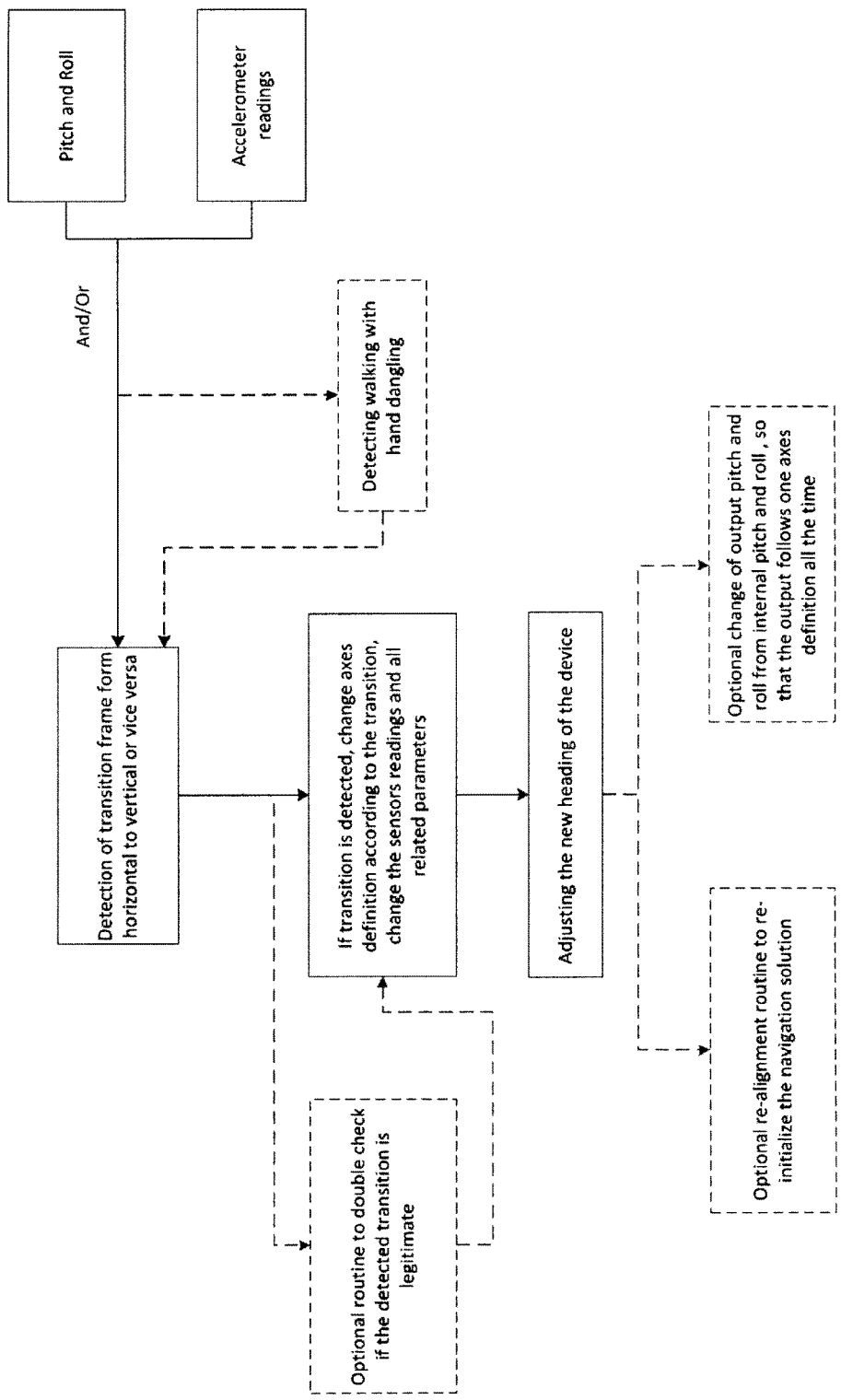
FIG. 2 shows a block diagram of one embodiment of the present method (optional embodiments shown with dotted lines)

FIG. 2 shows a schematic diagram of one embodiment of the present method, wherein optional embodiments are shown with dotted lines and dotted boxes.

The method and apparatus presented herein may be combined with a navigation solution, regardless of the type of navigation solution, regardless of the type of sensors used, and regardless of the type of the state estimation or filtering technique used in the navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

The present method and apparatus can be combined with a mode of conveyance algorithm or a mode detection algorithm to establish the mode of conveyance. This enables different scenarios such as for example walking and driving among other possible modes.

In addition to the above mentioned application of portable devices (that comprise a full navigation solution including position, velocity and attitude, or position and attitude), there are other applications (that may comprise estimating a full navigation solution, or an attitude only solution or an attitude and velocity solution) where the method to mitigate the aforementioned problems is needed for enhancing the user experience and usability, and may be applicable in a number of scenarios such as, for example:

Video gaming equipment;
Augmented reality equipment; or
Wrist watches.

Contemplated Embodiments

The present disclosure describes the body frame to be x forward, y positive towards right side of the body and z axis positive downwards. It is contemplated that any body-frame definition can be used for the application of the present method and apparatus described herein.

It is contemplated that the present method and apparatus can be used with a navigation solution that may optionally utilize automatic zero velocity periods or static period detection with its possible updates and inertial sensors bias recalculations, non-holonomic updates, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing algorithm and either running in post mission or in the background on buffered data within the same mission.

It is further contemplated that the present method and apparatus can be used with a navigation solution that is further programmed to run, in the background, a routine to simulate artificial outages in the absolute navigational information and estimate the parameters of another instance of the state estimation technique used for the navigation solution of the present disclosure to optimize the accuracy and the consistency of the navigation solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation.

It is further contemplated that the present method and apparatus can be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the present method and apparatus can be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancement is the carrier-smoothed pseudorange.

It is further contemplated that the present method and apparatus can be used with a navigation solution that relies on an ultra-tight integration scheme between GNSS receiver and the other sensors' readings.

It is further contemplated that the present method and apparatus can be used with a navigation solution that uses various wireless communication systems that can also be used for positioning and navigation either as an additional aid (will be more beneficial when GNSS is unavailable) or as a substitute for the GNSS information (e.g. for applications where GNSS is not applicable). Examples of such wireless communication systems used for positioning are those provided by cellular phone towers and signals, radio signals, digital television signals, WiFi, or Wimax. For example, for cellular phone based applications, an absolute coordinate from cell phone towers and the ranges between the indoor user and the towers may be used for positioning and navigation, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the present method and apparatus can be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device (s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the present method and apparatus can be used with various types of inertial sensors, other than MEMS based sensors described herein by way of example.

Without any limitation to the foregoing, the embodiments presented above are further demonstrated by way of the following examples.

Example

A low-cost prototype unit (for the portable device) consisting of a six degrees of freedom inertial unit from Invensense (i.e. tri-axial gyroscopes and tri-axial accelerometer) (MPU-6050), tri-axial magnetometers from Honeywell (HMC5883L), barometer from Measurement Specialties (MS5803), and a GPS receiver from u-blox (LEA-5T) was used to log data for several trajectories whether in walking, driving or walking and driving.

For demonstration purposes, two example walking trajectories are presented below.

Figure 3:
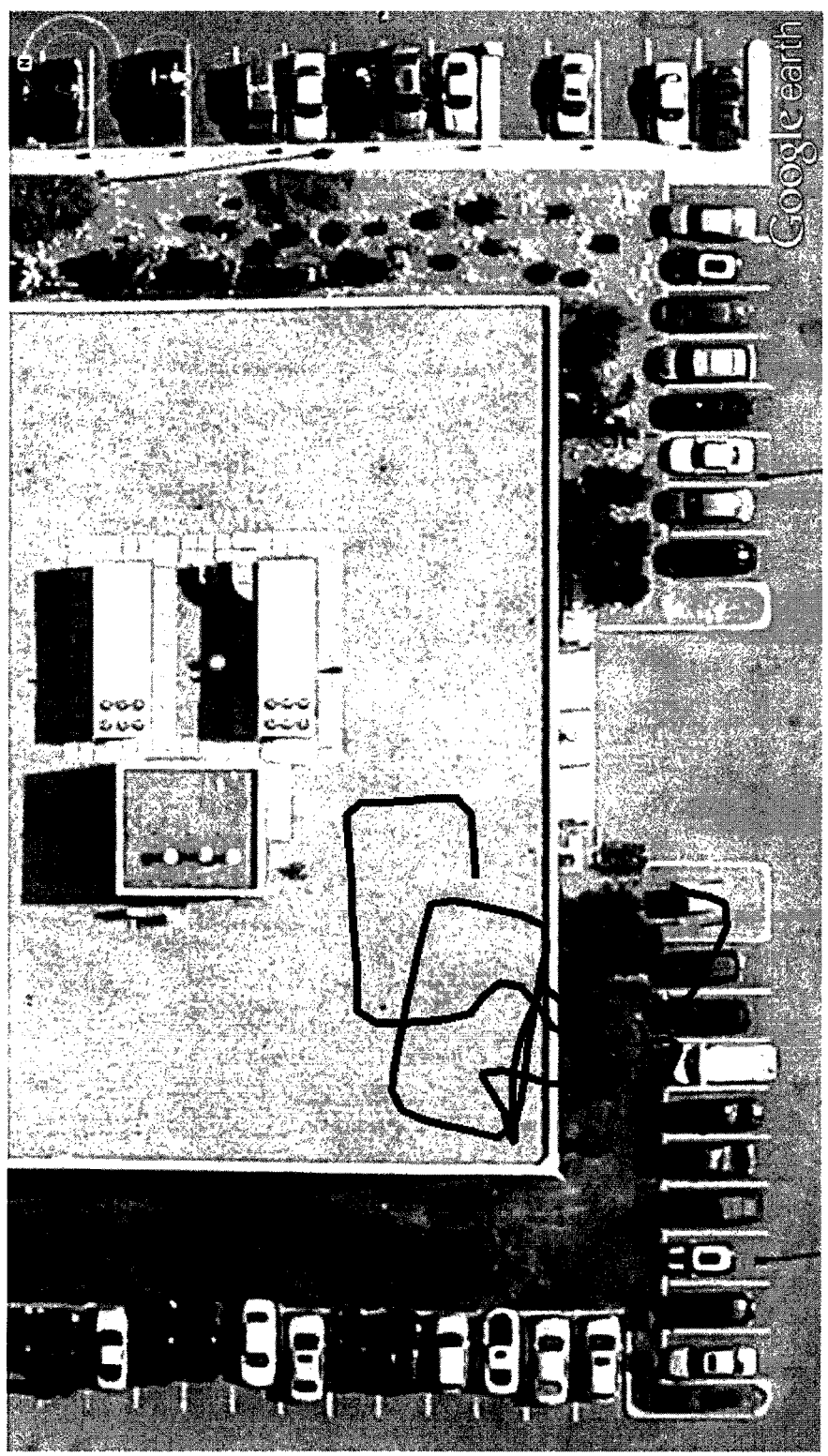
FIG. 3 shows a first trajectory result of a navigation solution without the present method, said trajectory including durations when the forward axis of the device is vertical or near vertical, without any absolute navigational update.
Figure 4:
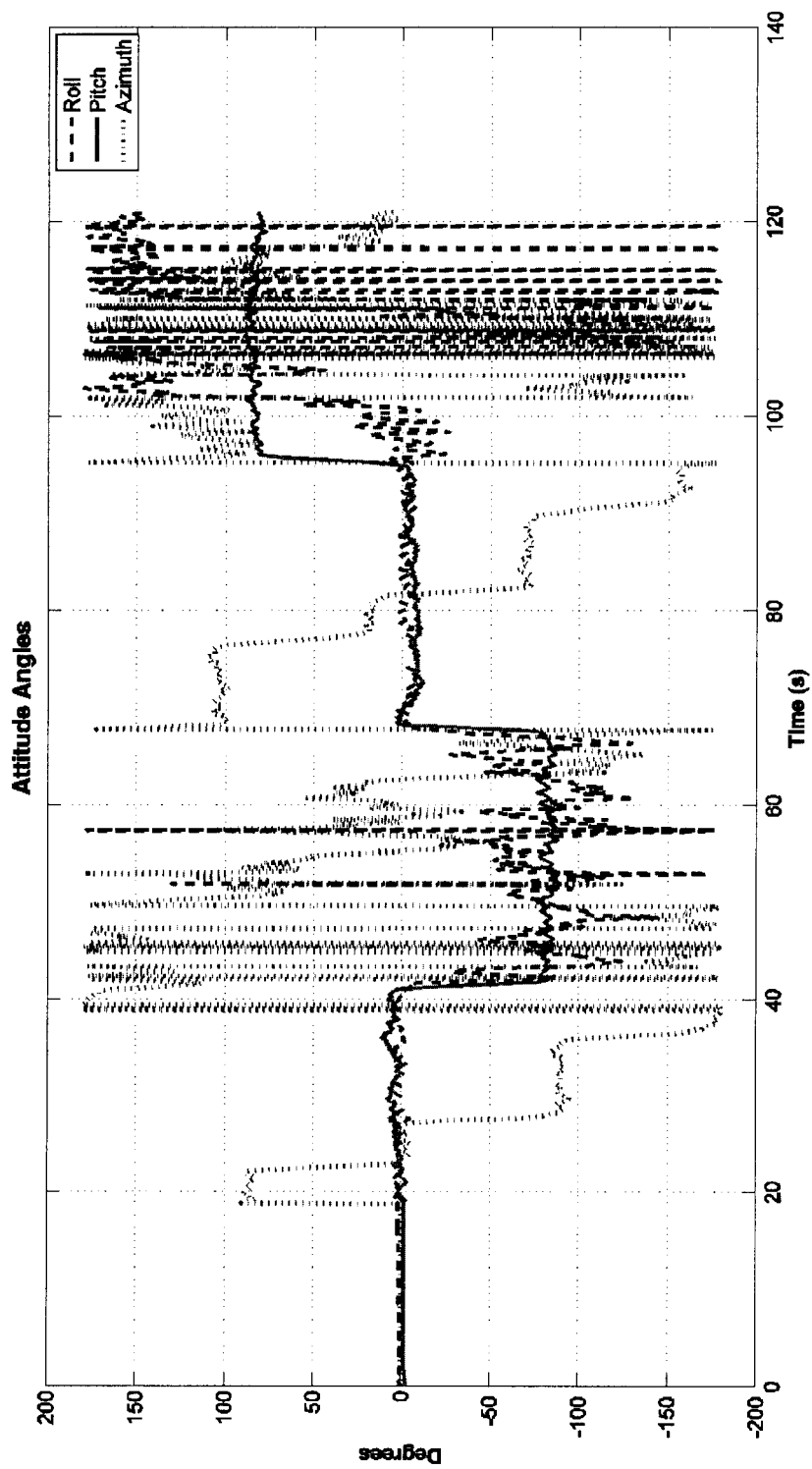
FIG. 4 shows pitch, roll, and azimuth results for the navigation solution in FIG. 3.
Figure 5:
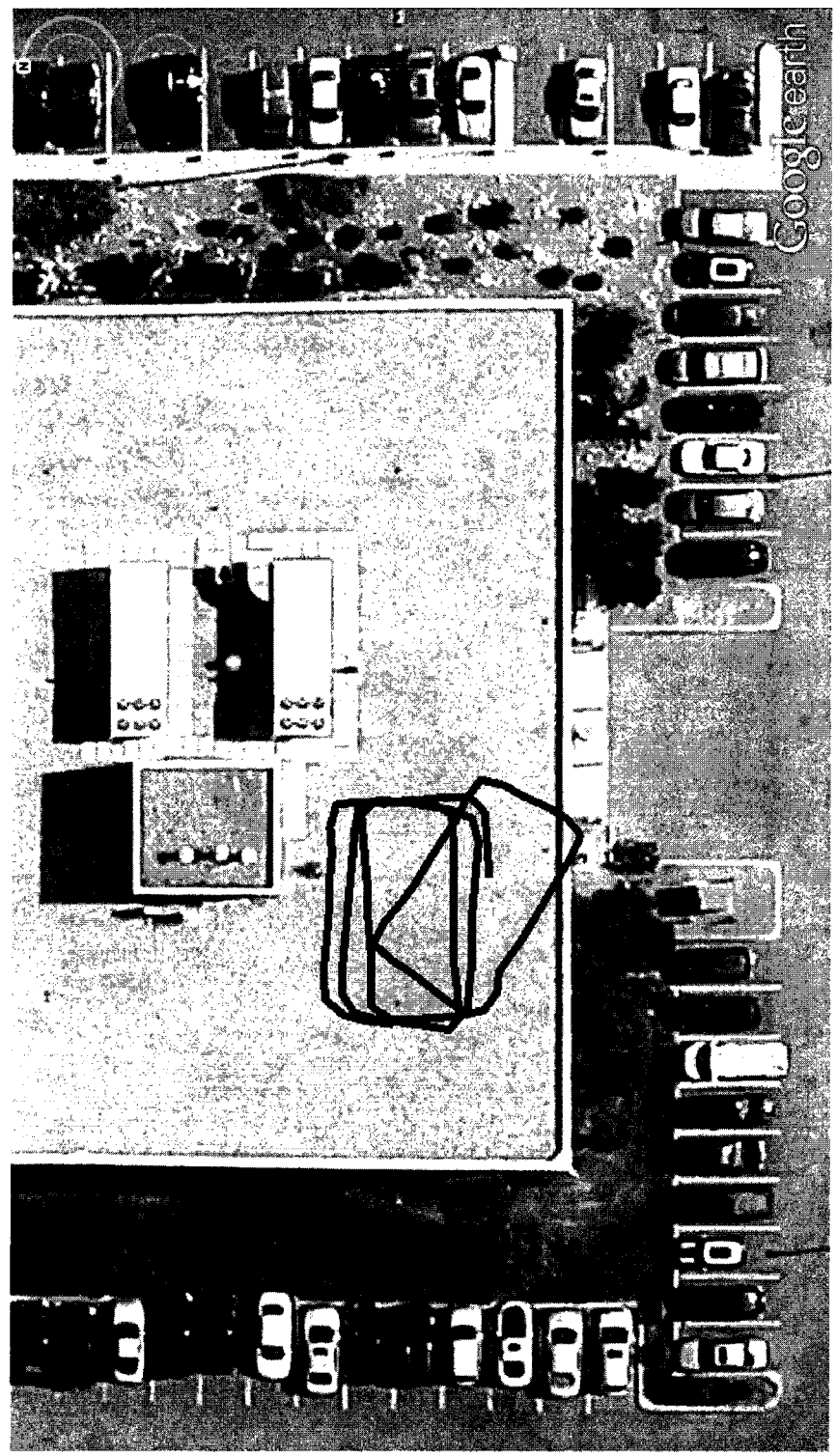
FIG. 5 shows the trajectory results for the same trajectory in FIG. 3, where a navigation solution in combination with one embodiment of the present method was used.
Figure 6:
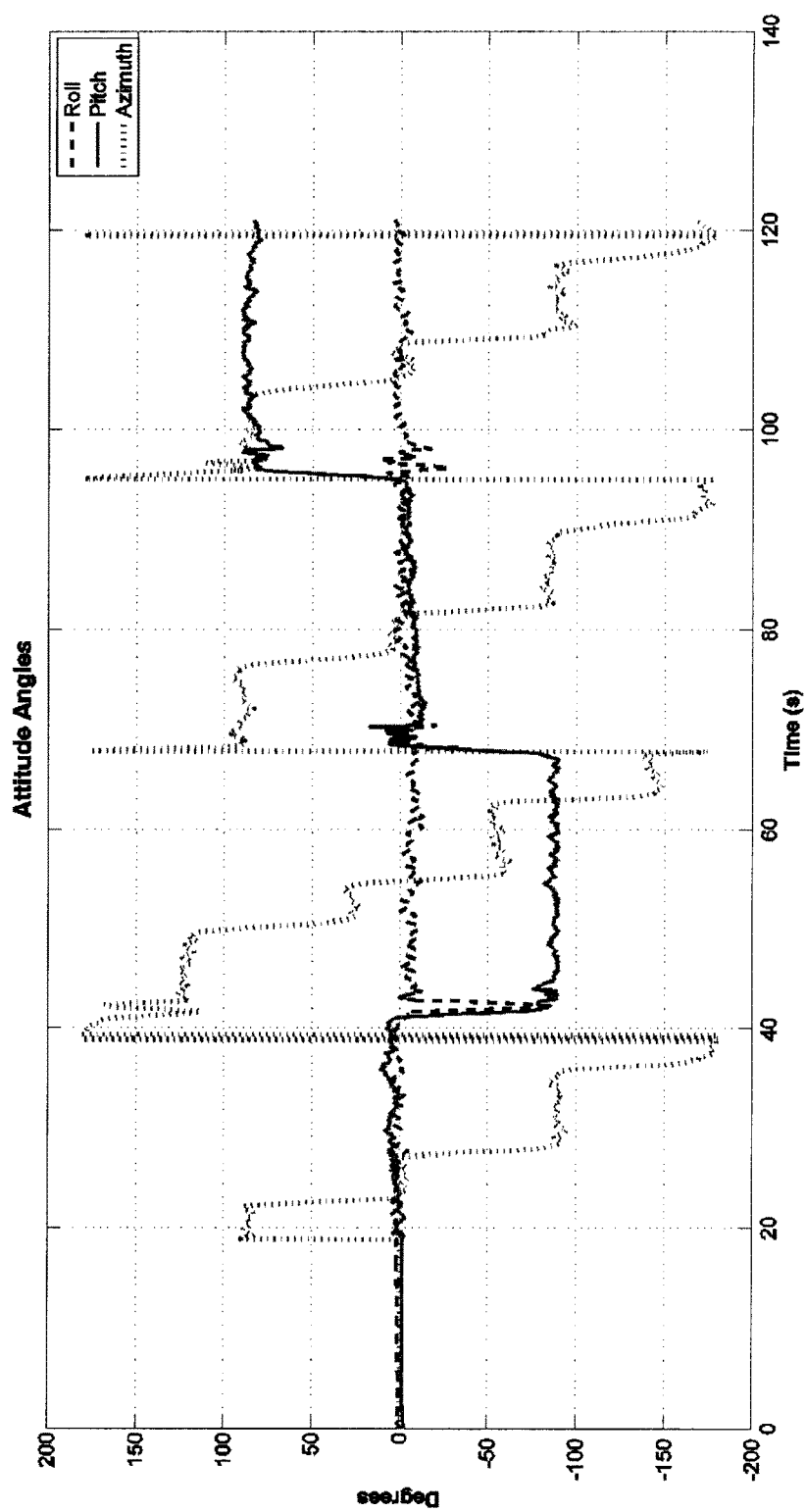
FIG. 6 shows pitch, roll, and azimuth results for the navigation solution in FIG. 5.

FIGS. 3, 4, 5, and 6 show sample positioning results in a pedestrian walking trajectory, including durations when the forward axis of the device was vertical or near vertical. This trajectory started in an indoor environment, with the user given position and heading, without absolute navigational updates (such as GNSS or WiFi) for the entire length of the trajectory. The trajectory consisted of four rectangular loops in corridors of an office building. In the first loop of this trajectory, the device was in a horizontal orientation. In the second loop, the device was in a vertical down orientation. In the third loop, the device was horizontal again, and in the fourth loop the device was in a vertical up orientation. The same integrated navigation solution, with all its components, was used in each trajectory either alone (FIGS. 3 and 4) or in combination with the present method (FIGS. 5 and 6).

Having regard to FIGS. 3 and 4, the positioning results and the roll, pitch and azimuth (heading) angles results, respectively, as provided by the navigation solution without the present method are shown.

FIGS. 5 and 6 show the positioning results and the roll, pitch and azimuth (heading) angles results, respectively, as provided by the navigation solution used in combination with the present method.

Figure 7:
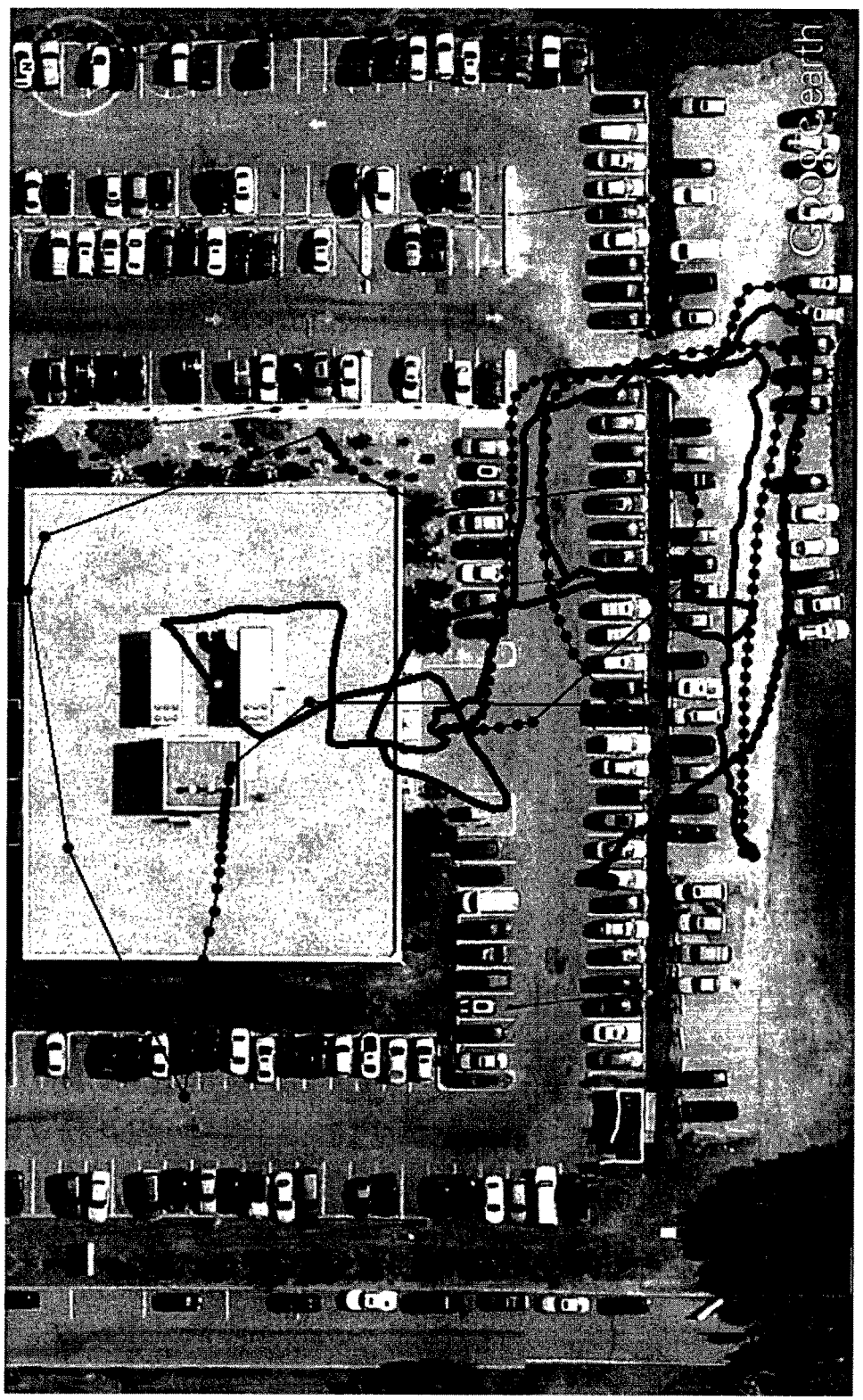
FIG. 7 shows a second trajectory result for a navigation solution without the present method (solid line), said trajectory including durations when the forward axis of the device is vertical or near vertical, said trajectory using GPS (line with dots) updates when available.
Figure 8:
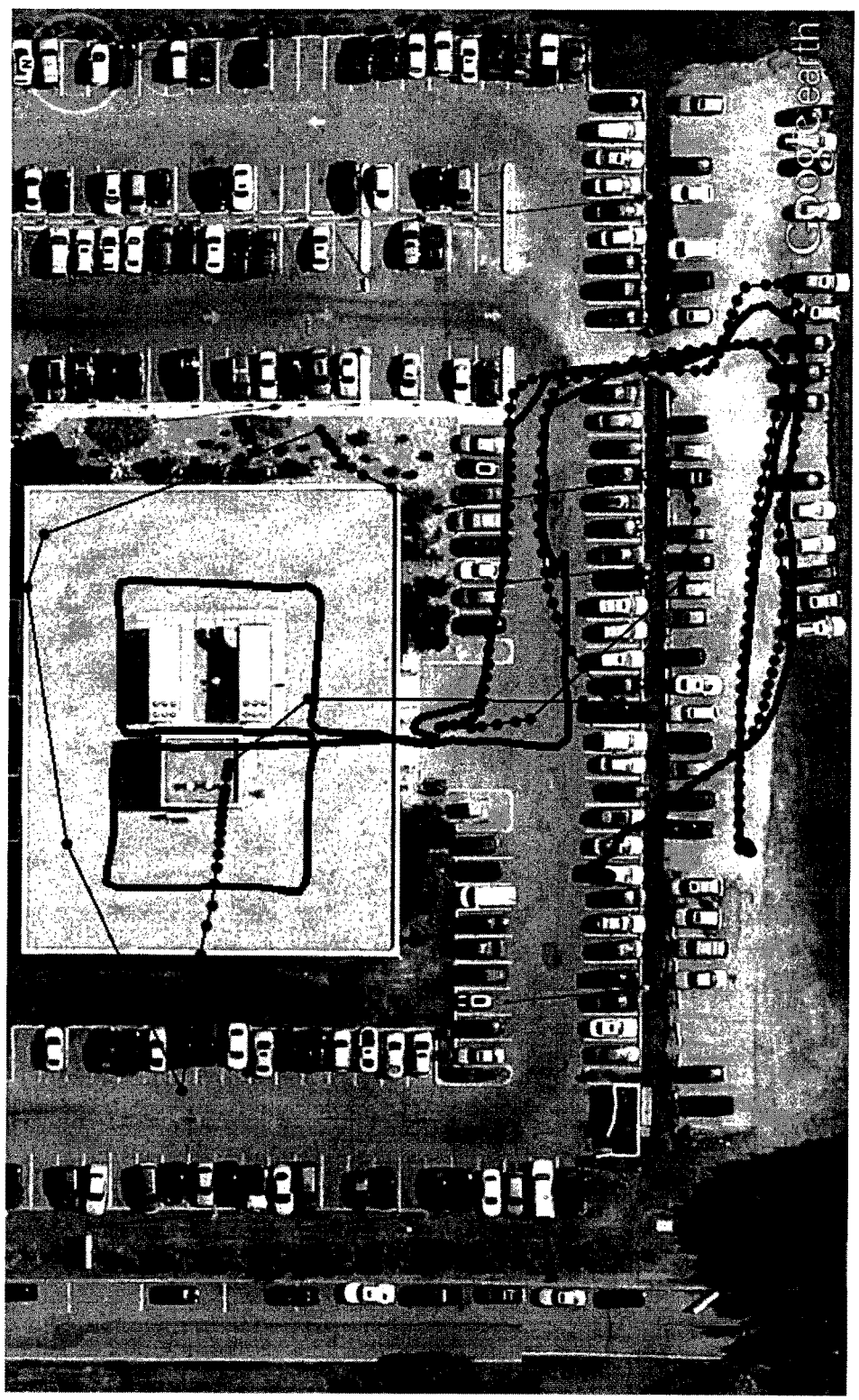
FIG. 8 shows the trajectory results of the same trajectory as FIG. 7 where a navigation solution in combination with one embodiment of the present method is used (solid line). GPS is presented by line with dots.

FIGS. 7 and 8 show sample positioning results provided by both GPS (in line with dots) and the navigation solution (in solid line) used alone (FIG. 7) or in combination with the present method (FIG. 8), in a second pedestrian walking trajectory, which also includes durations when the forward axis of the device is vertical or near vertical. This second trajectory started outdoors with GPS availability, and the full system was automatically initialized. While outdoors, and before going indoors, the device was put in the chest pocket in a vertical up position until the end of the trajectory. The indoor portion of the trajectory consisted of two rectangular loops in corridors of an office building forming a figure eight, and provided little to no access to GPS or any other absolute navigational updates.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for enhancing a navigation solution about a device, wherein mobility of the device may be constrained or unconstrained within a platform and the device can be tilted to any orientation, including vertical or near vertical orientations, the device having sensors configured to provide sensor readings, the sensors have a corresponding axes frame comprising three orthogonal axes, wherein the axes frame has a first definition, and the readings having error parameters, characterized by:
   i) detecting a transition in a forward axis of the device, wherein the transition involves a vertical or near vertical orientation, ii) where the transition is detected, updating the axes frame, wherein updating the axes frame comprises changing the axes frame to a second definition, and wherein at least one axis of the three orthogonal axes of the second definition is changed to another axis as compared to the first definition, changing the sensor readings and error parameters according to the updated axes frame, adjusting an estimated orientation of the device according to the updated axes frame, and at least partially re-initializing the navigation solution, and iii) outputting the enhanced navigation solution.

2. The method of claim 1, wherein the transition in the forward axis of the device is one of the following: from horizontal or near horizontal to vertical or near vertical, from vertical or near vertical to horizontal or near horizontal, from vertical up or near vertical up to vertical down or near vertical down, or from vertical down or near vertical down to vertical up or near vertical up.

3. The method of claim 1, wherein the method further comprises a re-alignment routine for fully or partially re-initializing the navigation solution.

4. The method of claim 1, wherein the method is operable whether in the presence or in the absence of absolute navigational information.

5. The method of claim 1, wherein the method further comprises a routine configured to avoid the use of continuous unneeded transitions between axes frames.

6. The method of claim 1, wherein the method further comprises a routine configured to detect whether a transition is legitimate.

7. The method of claim 1, wherein the method further comprises a routine configured to adjust output pitch and roll angles of the device to a default axes definition.

8. The method of claim 1, wherein the method further comprises any one or any combination of the following routines:
   a. a routine configured to avoid the use of continuous unneeded transitions,
   b. a routine configured to detect whether a transition is legitimate,
   c. a re-alignment routine, wherein the method is utilized for enhancing a navigation solution about the device, or
   d. a routine configured to adjust output pitch and roll angles of the device to a default axes definition.

9. A device having constrained or unconstrained mobility within a platform and being tiltable to any orientation including vertical or near vertical orientations, the device comprising:
   a. an assembly of sensors configured to provide sensor readings relating to navigational information about the device and producing an output indicative thereof, the sensors having a corresponding axes frame comprising three orthogonal axes, wherein the axes frame has a first definition, and the readings having corresponding error parameters; and
   b. at least one processor for enhancing a navigation solution about the device, coupled to receive the readings from the sensor assembly, and operative to:
      i) detect a transition in a forward axis of the device, wherein the transition involves a vertical or near vertical orientation,
      ii) where the transition is detected, update the axes frame, wherein updating the axes frame comprises changing the axes frame to a second definition, and wherein at least one axis of the three orthogonal axes of the second definition is changed to another axis as compared to the first definition, change the sensor readings and error parameters according to the updated axes frame, adjust an estimated orientation of the device according to the updated axes frame, and at least partially re-initialize the navigation solution, and
      iii) output the enhanced navigation solution.

10. The device of claim 9, wherein the transition in the forward axis of the device is one of the following: from horizontal or near horizontal to vertical or near vertical, from vertical or near vertical to horizontal or near horizontal, from vertical up or near vertical up to vertical down or near vertical down, or from vertical down or near vertical down to vertical up or near vertical up.

11. The device of claim 9, wherein the processor operates in the presence or in the absence of absolute navigational information.

* * * * *